US011006147B2

(12) United States Patent
Zhao et al.

(10) Patent No.: US 11,006,147 B2
(45) Date of Patent: May 11, 2021

(54) DEVICES AND METHODS FOR 3D VIDEO CODING

(71) Applicant: Huawei Technologies Co., Ltd., Shenzhen (CN)

(72) Inventors: Zhijie Zhao, Munich (DE); Jens Schneider, Aachen (DE); Johannes Sauer, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 27 days.

(21) Appl. No.: 16/220,699

(22) Filed: Dec. 14, 2018

(65) Prior Publication Data

US 2019/0124361 A1    Apr. 25, 2019

Related U.S. Application Data

(63) Continuation of application No. PCT/EP2016/064041, filed on Jun. 17, 2016.

(51) Int. Cl.
*H04N 19/597* (2014.01)
*H04N 19/176* (2014.01)
(Continued)

(52) U.S. Cl.
CPC ......... *H04N 19/597* (2014.11); *H04N 13/111* (2018.05); *H04N 13/128* (2018.05); *H04N 13/161* (2018.05); *H04N 19/176* (2014.11)

(58) Field of Classification Search
CPC .. H04N 19/597; H04N 19/176; H04N 19/128; H04N 13/261; H04N 13/128; H04N 13/161; H04N 13/111
(Continued)

(56) References Cited

U.S. PATENT DOCUMENTS

2007/0024614 A1*   2/2007   Tam ............... H04N 13/261
                                                 345/419
2012/0229602 A1*   9/2012   Chen .............. H04N 19/597
                                                 348/43
(Continued)

FOREIGN PATENT DOCUMENTS

CN       104284195 A       1/2015
CN       104662910 A       5/2015
(Continued)

OTHER PUBLICATIONS

Shimizu et al., "Description of 3D Video Coding Technology Proposal by NTT," ISO/IEC JTC1/SC29/WG11MPEG2011/M22616, Geneva, Switzerland, International Organization for Standardisation (2011).

(Continued)

*Primary Examiner* — Albert Kir
(74) *Attorney, Agent, or Firm* — Leydig, Voit & Mayer, Ltd.

(57) ABSTRACT

An apparatus for decoding 3D video data is provided, the 3D video data comprising a plurality of texture frames and a plurality of associated depth maps, the apparatus comprising: a first texture decoder configured to decode a video coding block of a first texture frame associated with a first view; a first depth map decoder configured to decode a video coding block of a first depth map associated with the first texture frame; a depth map filter configured to generate an auxiliary depth map on the basis of the first depth map; a first view synthesis prediction unit configured to generate a predicted video coding block of a view synthesis predicted second texture frame associated with a second view on the basis of the video coding block of the first texture frame and the auxiliary depth map.

14 Claims, 10 Drawing Sheets

(51) Int. Cl.
    H04N 13/161    (2018.01)
    H04N 13/128    (2018.01)
    H04N 13/111    (2018.01)
(58) Field of Classification Search
    USPC .................................................. 375/240.12
    See application file for complete search history.

(56) References Cited

U.S. PATENT DOCUMENTS

| | | | | |
|---|---|---|---|---|
| 2014/0023292 | A1* | 1/2014 | Yamada | G06T 7/80 |
| | | | | 382/289 |
| 2016/0065990 | A1* | 3/2016 | Shimizu | H04N 19/597 |
| | | | | 375/240.12 |
| 2017/0324961 | A1* | 11/2017 | Jin | H04N 19/147 |

FOREIGN PATENT DOCUMENTS

| | | |
|---|---|---|
| CN | 105247862 A | 1/2016 |
| WO | 2012090181 A1 | 7/2012 |
| WO | 2015023826 A1 | 2/2015 |

OTHER PUBLICATIONS

Hannuksela et al., "Suggestion for a depth-enhanced multiview video coding extension to H.264, Annex A: Nokia 3DV Test Model (3DV-TM) Codec Description and Simulation Results," ITU-Telecommunications Standarisation Sector, 44th Meeting, San Jose, CA, USA, VCEG—AR14, XP030003858, International Telecommunications Union, Geneva, Switzerland (Feb. 3-10, 2012).

Mouad et al., "Study of edge detection methods based on palmprint lines," 2016 International Conference on Electrical, Electronics, and Optimization Techniques(ICEEOT), XP055330001, pp. 1344-1350, Institute of Electrical and Electronics Engineers, New York, New York (Mar. 1, 2016).

Perez et al., "Poisson Image Editing," ACM SIGGRAPH 2003 Papers, XP058134297, pp. 313-318 (2003).

Chen et al., "Test Model 10 of 3D-HEVC and MV-HEVC," Joint Collaborative Team on 3D Video Coding Extension Development of ITU-T SG 16 WP 3 and ISO/IEC JTC 1/SC 29/WG 11, 10th Meeting, Strasbourg, FR, JCT3V-J1003, International Telecommunications Union, Geneva, Switzerland (Oct. 18-24, 2014).

Zou et al., "View Synthesis Prediction in the 3-D Video Coding Extensions of AVC and HEVC," IEEE Transactions on Circuits and Systems for Video Technology, vol. 24, No. 10, Institute of Electrical and Electronics Engineers, New York, New York (Oct. 2014).

Tech et al., "Overview of the Multiview and 3D Extensions of High Efficiency Video Coding," IEEE Transactions on Circuits and Systems for Video Technology, vol. 26, No. 1, Institute of Electrical and Electronics Engineers, New York, New York (Jan. 2016).

Schneider et al., "Enhanced view synthesis prediction for coding of non-coplanar 3D video sequences," (2016).

Grossmann et al., "Numerical Treatment of Partial Differential Equations," Springer, pp. 1-601 (2007).

Wien, "High Efficiency Video Coding, Coding Tools and Specification," Springer-Verlag Berlin Heidelberg, pp. 1-331 (2015).

Ricordel et al., "3D coding tools final report," Livrable D4.3, Projet Persee, pp. 1-89 (Jul. 31, 2013).

* cited by examiner

DEVICES AND METHODS FOR 3D VIDEO CODING

CROSS-REFERENCE TO RELATED APPLICATIONS

This application is a continuation of International Application No. PCT/EP2016/064041, filed on Jun. 17, 2016, the disclosure of which is hereby incorporated by reference in its entirety.

TECHNICAL FIELD

Generally, embodiments of the present invention relate to the field of video coding. More specifically, embodiments of the present invention relate to an apparatus for encoding and an apparatus for decoding 3D video data as well as corresponding methods.

BACKGROUND

In 3D video coding multiple sequences of texture frames have to be coded, which feature at least two different views of a scene. The known standard 3D-HEVC only supports block-based view synthesis prediction for coplanar camera arrangements, i.e. views from locations within a single plane. For non-coplanar camera arrangements the assumption that whole blocks move by the same disparity between different views no longer holds. In this case each pixel can shift differently between the views, and therefore conventional view synthesis prediction approaches will fail. For this purpose, it has been suggested to use pixel-based depth maps directly instead of block vectors derived therefrom. However, estimated and coded depth maps which are optimized for output view synthesis often are not consistent enough for this. Thus, an enhancement of the depth maps is necessary, which is implemented as inter-layer filtering, before the pixel-based depth map is used for view synthesis prediction.

In current approaches based on depth maps video sequences for several views of a scene contain texture data in the form of texture frames and depth map data in the form of corresponding depth maps. Generally, the camera parameters, such as the calibration matrix and the relation to a world coordinate system, are known for each view and for each frame, in case these parameters vary in time. Using 3D warping the different views can be mapped to one another. The mapping is often imperfect, since occlusions are likely to occur in the warped view.

To make an example, say a view named "View 0" shall be warped to the view "View 1". "View 0" is denoted as the reference view and "View 1" is denoted as the target or dependent view. Then, for non-occluded parts the warped view "Warped 0" is a good predictor for "View 1". Consequently the coding performance can be improved by including "Warped 0" into the reference picture list used for the prediction of "View 1". This is applicable for both texture frames and depth maps.

The quality of the depth map is very important for the 3D warping of one view to another. Typically the depth map has to be estimated by an algorithm which has only the textures and the camera parameters available. The resulting depth maps are prone to errors. For example a flat but highly textured area in the texture frame can lead to an uneven surface in the estimated depth map. When in the example above the depth map is used to warp a texture frame from "View 0" to "View 1" this unevenness leads to inconsistencies in "Warped 0". This affects the number of regions which will be chosen by the encoder to predict "View 0" from "Warped 0".

Thus, there is a need for devices and methods for encoding and decoding 3D video data using depth maps.

SUMMARY

It is an object of the invention to provide improved devices and methods for encoding and decoding 3D video data using depth maps.

The foregoing and other objects are achieved by the subject matter of the independent claims. Further implementation forms are apparent from the dependent claims, the description and the figures.

According to a first aspect the invention relates to an apparatus for decoding 3D video data, the 3D video data comprising a plurality of texture frames and a plurality of associated depth maps, each texture frame and each depth map being dividable into a plurality of video coding blocks. The apparatus comprises a first texture decoder configured to decode a video coding block of a first texture frame associated with a first view, a first depth map decoder configured to decode a video coding block of a first depth map associated with the first texture frame, a depth map filter configured to generate an auxiliary depth map on the basis of the first depth map, a first view synthesis prediction unit configured to generate a predicted video coding block of a view synthesis predicted second texture frame associated with a second view on the basis of the video coding block of the first texture frame and the auxiliary depth map, and a second view synthesis prediction unit configured to generate a predicted video coding block of a view synthesis predicted second depth map on the basis of the first depth map, wherein the view synthesis predicted second depth map is associated with the view synthesis predicted second texture frame.

Thus, an improved decoding apparatus for 3D video coding using depth maps is provided.

The video coding blocks could be macro blocks, coding tree units, coding units, prediction units and/or prediction blocks. Each video coding block can comprise a plurality of pixels. The term "depth map" used herein is to cover any kind of maps or frames providing distance information about distance, such as distance maps or disparity maps. The first texture frame decoder and the first depth map decoder may be implemented as a unit including one or more processing blocks configured to generate a first texture frame and a first depth map, such as for instance a reconstructed texture frame and a reconstructed depth map.

In a first possible implementation form of the apparatus according to the first aspect as such, the apparatus further comprises a second texture decoder configured to decode a video coding block of a second texture frame associated with the second view on the basis of the predicted video coding block of the view synthesis predicted second texture frame, and a second depth map decoder configured to decode a video coding block of the second depth map associated with the second texture frame on the basis of the predicted video coding block of the view synthesis predicted second depth map.

The second texture frame decoder and the second depth map decoder may be implemented as a unit including one or more processing blocks configured to generate a first texture frame and a first depth map, such as for instance a reconstructed texture frame and a reconstructed depth map.

In a second possible implementation form of the apparatus according to the first aspect as such or the first implementation form thereof, the depth map filter is configured to detect at least one edge in the first depth map and to generate the auxiliary depth map on the basis of the pixels of the first depth map in the vicinity of the at least one edge.

In a third possible implementation form of the apparatus according to the second implementation form of the first aspect, the depth map filter is configured to detect at least one edge in the first depth map by detecting at least one pixel in the first depth map, for which the mean variance of the depth values of the pixels of the first depth map in the vicinity of the at least one pixel is larger than a threshold value.

In a fourth possible implementation form of the apparatus according to the second or third implementation form of the first aspect, the depth map filter is configured to generate the auxiliary depth map as the solution of a boundary value problem, wherein the at least one edge in the first depth map defines a boundary of the boundary value problem.

In a further implementation form the second texture decoder is configured to decode the video coding block of the second texture frame associated with the second view by decoding encoded differences, i.e. residuals, between a video coding block of an input second texture frame associated with the second view and a predicted video coding block of the second texture frame.

According to a second aspect the invention relates to an apparatus for encoding 3D video data, the 3D video data comprising a plurality of texture frames and a plurality of associated depth maps. The apparatus comprises a first texture encoder configured to encode a video coding block of a first texture frame associated with a first view, a first depth map encoder configured to encode a video coding block of a first depth map associated with the first texture frame, a depth map filter configured to generate an auxiliary depth map on the basis of the first depth map, a first view synthesis prediction unit configured to generate a predicted video coding block of a view synthesis predicted second texture frame associated with a second view on the basis of the video coding block of the first texture frame and the auxiliary depth map, and a second view synthesis prediction unit configured to generate a predicted video coding block of a view synthesis predicted second depth map on the basis of the first depth map, wherein the view synthesis predicted second depth map is associated with the predicted video coding block of the view synthesis predicted second texture frame.

Thus, an improved encoding apparatus for 3D video coding using depth maps is provided.

The video coding blocks could be macro blocks, coding tree units, coding units, prediction units and/or prediction blocks. Each video coding block can comprise a plurality of pixels. The term "depth map" used herein is to cover any kind of maps or frames providing distance information about distance, such as distance maps or disparity maps. The first texture frame encoder and the first depth map encoder may be implemented as a unit including one or more processing blocks configured to generate a first texture frame and a first depth map, such as for instance a reconstructed texture frame and a reconstructed depth map.

In a first possible implementation form of the apparatus according to the second aspect as such, the apparatus further comprises a second texture encoder configured to encode a video coding block of the second texture frame associated with the second view on the basis of the predicted video coding block of the view synthesis predicted second texture frame, and a second depth map encoder configured to encode a video coding block of a second depth map associated with the second texture frame on the basis of the predicted video coding block of the view synthesis predicted second depth map associated with the predicted video coding block of the view synthesis predicted second texture frame.

In a second possible implementation form of the apparatus according to the second aspect as such or the first implementation form thereof, the depth map filter is configured to detect at least one edge in the first depth map and to generate the auxiliary depth map on the basis of the pixels of the first depth map in the vicinity of the at least one edge.

In a third possible implementation form of the apparatus according to the second implementation form of the second aspect, the depth map filter is configured to detect at least one edge in the first depth map by detecting at least one pixel in the first depth map, for which the mean variance of the depth values of the pixels of the first depth map in the vicinity of the at least one pixel is larger than a threshold value.

In a fourth possible implementation form of the apparatus according to the second or third implementation form of the second aspect, the depth map filter is configured to generate the auxiliary depth map as the solution of a boundary value problem, wherein the at least one edge in the first depth map defines a boundary of the boundary value problem.

In a further implementation form, the second texture encoder is configured to encode a video coding block of the second texture frame associated with the second view by encoding the differences, i.e. residuals, between a video coding block of a second input texture frame associated with the second view and the predicted video coding block of the second texture frame.

According to a third aspect the invention relates to a method for decoding 3D video data, the 3D video data comprising a plurality of texture frames and a plurality of associated depth maps. The method comprises the steps of decoding a video coding block of a first texture frame associated with a first view, decoding a video coding block of a first depth map associated with the first texture frame, generating an auxiliary depth map on the basis of the first depth map, generating a predicted video coding block of a view synthesis predicted second texture frame associated with a second view on the basis of the video coding block of the first texture frame and the auxiliary depth map, and generating a predicted video coding block of a view synthesis predicted second depth map associated with the predicted video coding block of the view synthesis predicted second texture frame on the basis of the first depth map.

Thus, an improved decoding method for 3D video coding using depth maps is provided.

The video coding blocks could be macro blocks, coding tree units, coding units, prediction units and/or prediction blocks. Each video coding block can comprise a plurality of pixels. The term "depth map" used herein is to cover any kind of maps or frames providing distance information about distance, such as distance maps or disparity maps.

In a first possible implementation form of the method according to the third aspect as such, the method further comprises the steps of decoding a video coding block of a second texture frame associated with the second view on the basis of the predicted video coding block of the view synthesis predicted second texture frame, and decoding a video coding block of the second depth map associated with the second texture frame on the basis of the predicted video coding block of the view synthesis predicted second depth map.

In a second possible implementation form of the method according to the third aspect as such or the first implementation form thereof, the step of generating the auxiliary depth map on the basis of the first depth map comprises the step of detecting at least one edge in the first depth map and generating the auxiliary depth map on the basis of the pixels of the first depth map in the vicinity of the at least one edge.

In a further implementation form, the step of decoding a video coding block of the second texture frame associated with the second view comprises the step of decoding the differences, i.e. residuals, between a video coding block of a second input texture frame associated with the second view and the predicted video coding block of the second texture frame.

The method according to the third aspect of the invention can be performed by the apparatus according to the first aspect of the invention. Further features and implementation forms of the method according to the third aspect of the invention result directly from the functionality of the apparatus according to the first aspect of the invention and its different implementation forms.

According to a fourth aspect the invention relates to a method for encoding 3D video data, wherein the 3D video data comprises a plurality of texture frames and a plurality of associated depth maps. The method comprises the steps of encoding a video coding block of a first texture frame associated with a first view, encoding a video coding block of a first depth map associated with the first texture frame, generating an auxiliary depth map on the basis of the first depth map, generating a predicted video coding block of a view synthesis predicted second texture frame associated with a second view on the basis of the video coding block of the first texture frame and the auxiliary depth map, and generating a predicted video coding block of a view synthesis predicted second depth map associated with the predicted video coding block of the view synthesis predicted second texture frame on the basis of the first depth map.

Thus, an improved encoding method for 3D video coding using depth maps is provided.

The video coding blocks could be macro blocks, coding tree units, coding units, prediction units and/or prediction blocks. Each video coding block can comprise a plurality of pixels. The term "depth map" used herein is to cover any kind of maps or frames providing distance information about distance, such as distance maps or disparity maps.

In a first possible implementation form of the method according to the fourth aspect as such, the method further comprises the steps of encoding a video coding block of a second texture frame associated with the second view on the basis of the predicted video coding block of the view synthesis predicted second texture frame, and encoding a video coding block of the second depth map associated with the second texture frame on the basis of the predicted video coding block of the view synthesis predicted second depth map.

In a second possible implementation form of the method according to the fourth aspect as such or the first implementation form thereof, the step of generating the auxiliary depth map on the basis of the first depth map comprises the step of detecting at least one edge in the first depth map and generating the auxiliary depth map on the basis of the pixels of the first depth map in the vicinity of the at least one edge.

In a further implementation form, the step of encoding a video coding block of the second texture frame associated with the second view comprises the step of encoding the differences, i.e. residuals, between a video coding block of a second input texture frame associated with the second view and the predicted video coding block of the second texture frame.

The method according to the fourth aspect of the invention can be performed by the apparatus according to the second aspect of the invention. Further features and implementation forms of the method according to the fourth aspect of the invention result directly from the functionality of the apparatus according to the second aspect of the invention and its different implementation forms.

According to a fifth aspect the invention relates to a computer program comprising program code for performing the method according to the third aspect or the method according to the fourth aspect when executed on a computer.

The invention can be implemented in hardware and/or software.

BRIEF DESCRIPTION OF THE DRAWINGS

Further embodiments of the invention will be described with respect to the following figures, wherein.

In the various figures, identical reference signs will be used for identical or at least functionally equivalent features.

DETAILED DESCRIPTION OF THE EMBODIMENTS

In the following description, reference is made to the accompanying drawings, which form part of the disclosure, and in which are shown, by way of illustration, specific aspects in which the present invention may be placed. It is understood that other aspects may be utilized and structural or logical changes may be made without departing from the scope of the present invention. The following detailed description, therefore, is not to be taken in a limiting sense, as the scope of the present invention is defined be the appended claims.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various exemplary aspects described herein may be combined with each other, unless specifically noted otherwise.

Figure 1A:
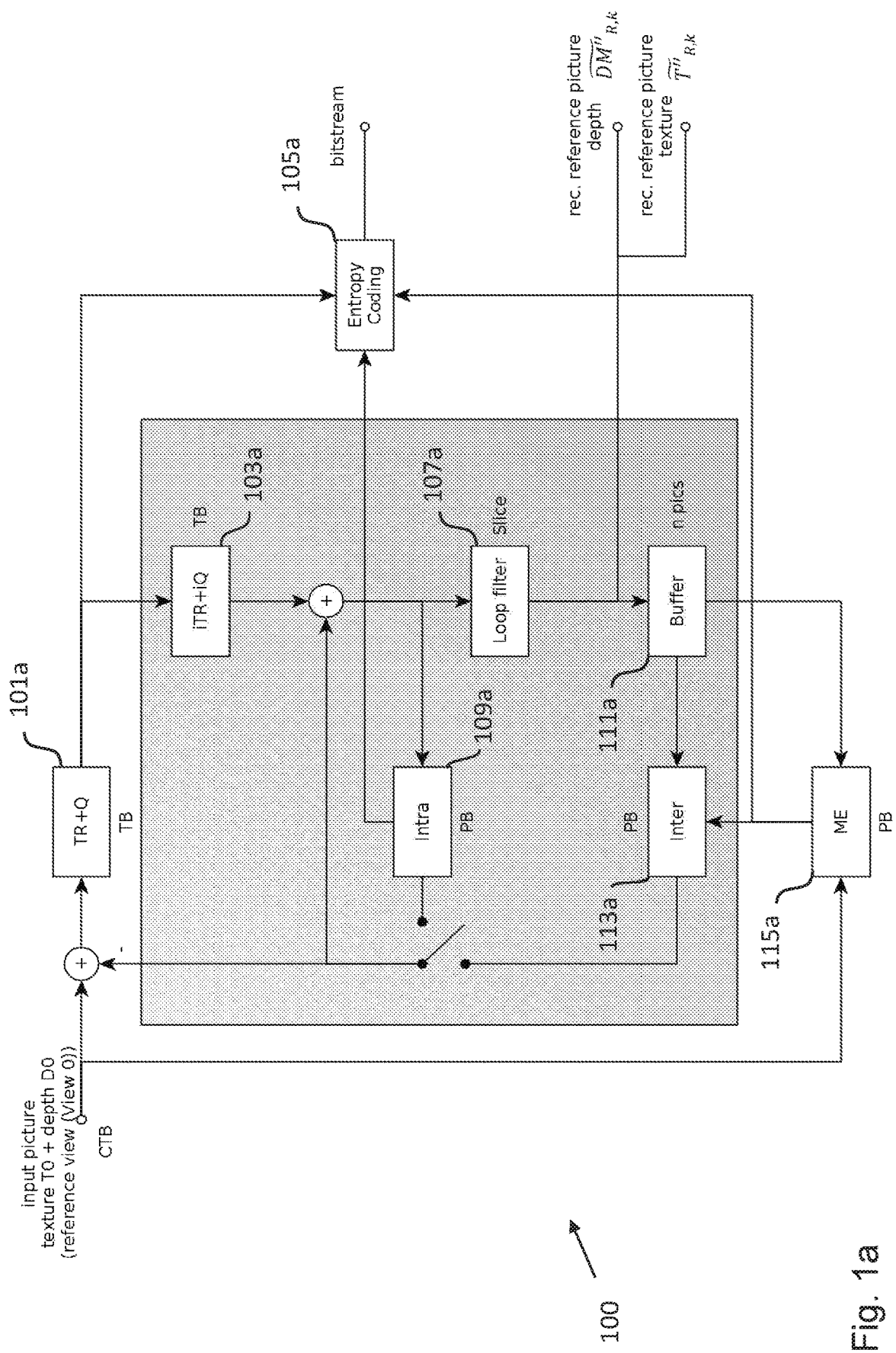
FIGS. 1a and 1b show schematic diagrams illustrating a reference layer and a dependent layer of an apparatus for encoding 3D video data according to an embodiment.
Figure 1B:
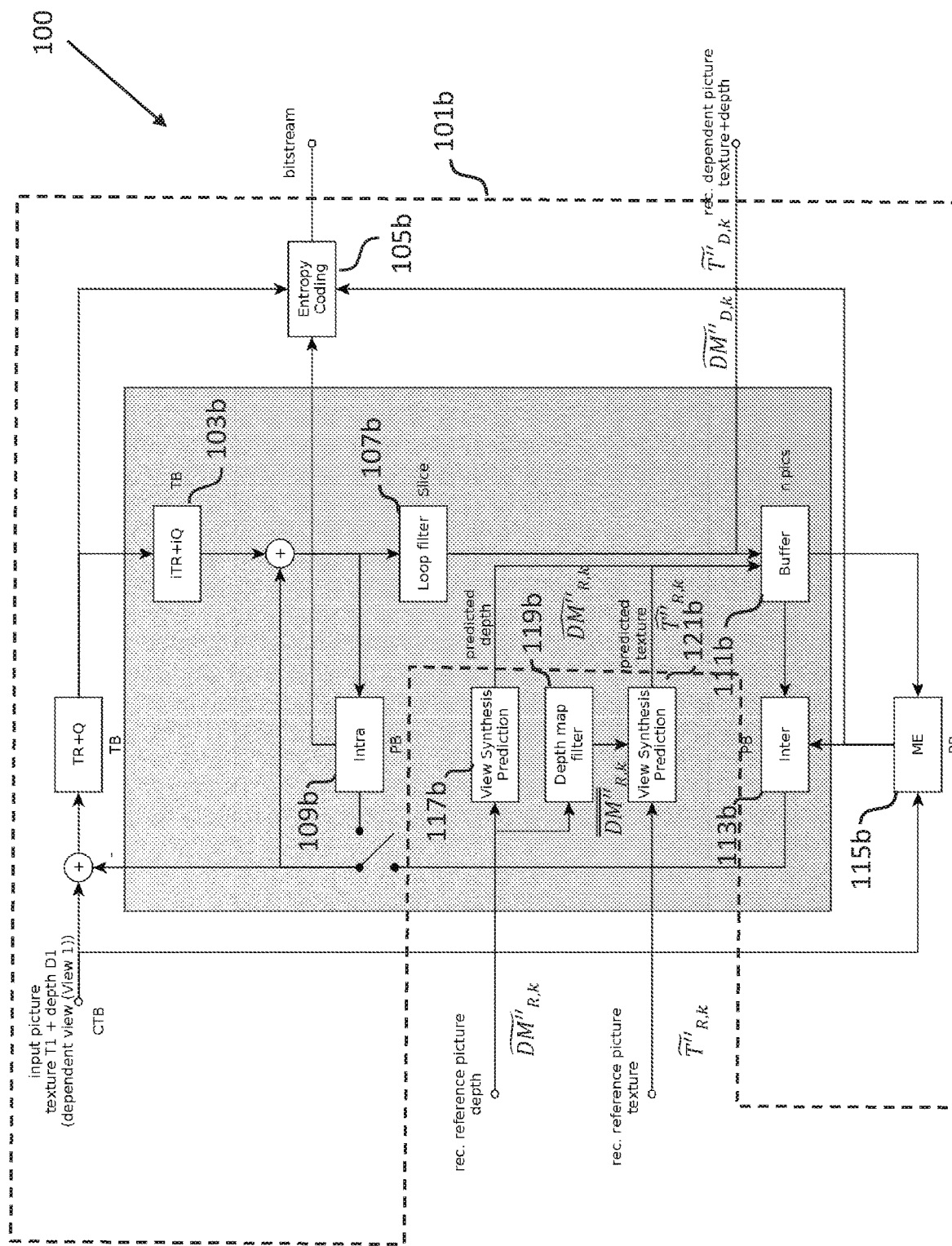

FIGS. 1a and 1b show schematic diagrams illustrating a reference layer (shown in FIG. 1a) and a dependent layer (shown in FIG. 1b) of an apparatus 100 for encoding 3D video data according to an embodiment. The apparatus 100 is configured to encode 3D video data comprising a plurality of texture frames and a plurality of associated depth maps, wherein each texture frame and each depth maps can be partitioned into a plurality of video coding blocks. The video coding blocks could be, for instance, macro blocks, coding tree units, coding units, prediction units and/or prediction blocks. Each video coding block can comprise a plurality of pixels. The term "depth map" used herein is to cover any kind of maps or frames providing distance information about distance, such as distance maps or disparity maps.

Figure 2A:
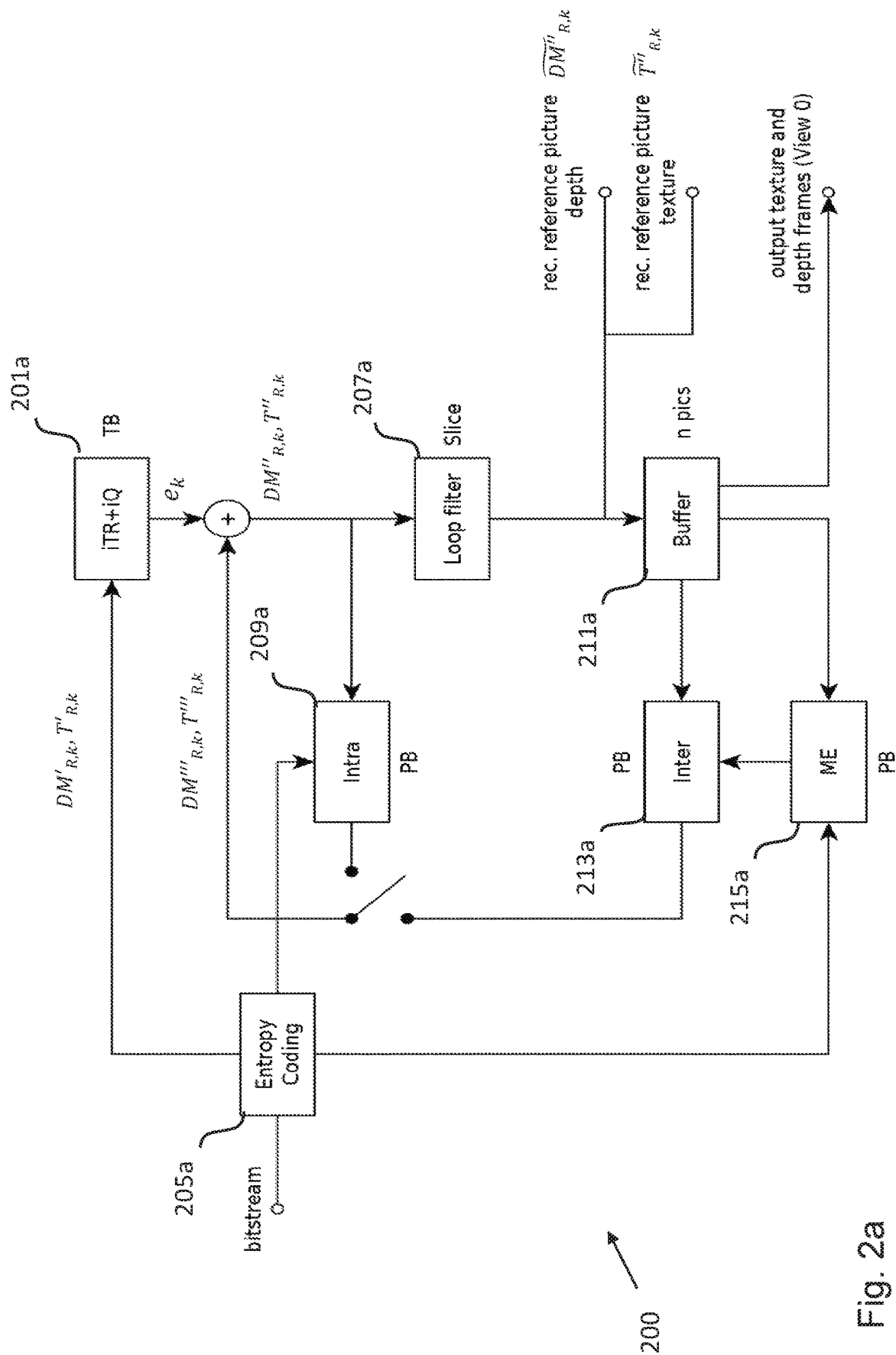
FIGS. 2a and 2b show schematic diagrams illustrating a reference layer and a dependent layer of an apparatus for decoding 3D video data according to an embodiment.
Figure 2B:
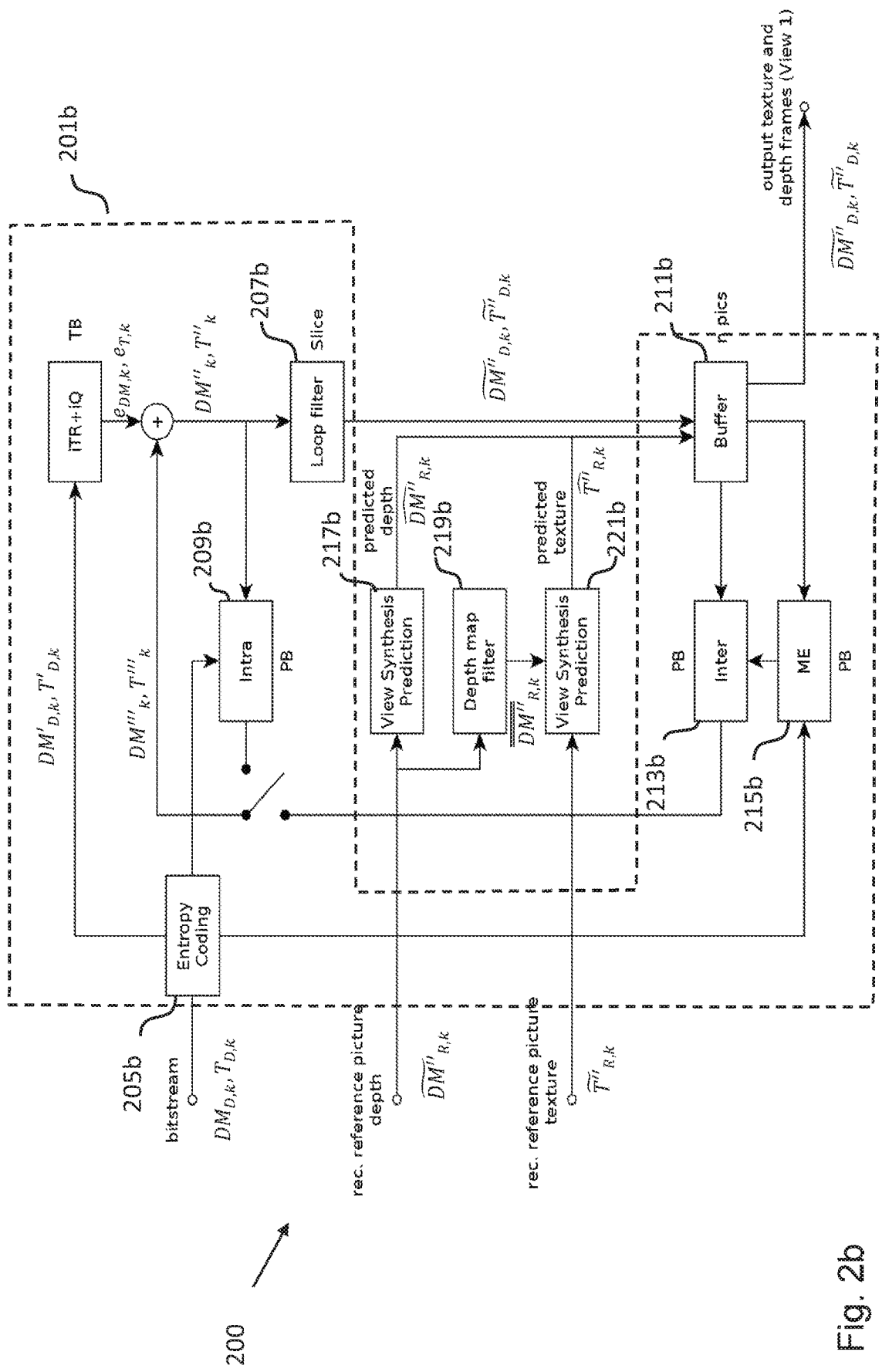

FIGS. 2a and 2b show schematic diagrams illustrating a reference layer (shown in FIG. 2a) and a dependent layer (shown in FIG. 2b) of a corresponding apparatus 200 for decoding 3D video data according to an embodiment.

The embodiments of FIGS. 1a,b and 2a,b show an exemplary setup based on two views, namely a reference view or "View 0" and a dependent view or "View 1", wherein each view is associated with a (temporal) sequence of texture frames and corresponding depth maps. The person skilled in the art will readily appreciate how to extend the embodiments shown in FIGS. 1a,b and 2a,b to more than two views. Very generally both texture and depth map are used for a view synthesis prediction of the dependent view "View 1" on the basis of the reference view "View 0". In other words, output from the reference layer is used for processing in the dependent layer. As will be described in more detail below, an inter-layer depth map filter is applied to generate an auxiliary depth map by smoothing the original depth map before it is used for the view synthesis prediction of the texture frame of the dependent view.

The encoding apparatus 100 shown in FIGS. 1a, b comprises a first texture encoder configured to encode a video coding block of a first texture frame associated with the reference view. Moreover, the apparatus 100 comprises a first depth map encoder configured to encode a video coding block of a first depth map associated with the first texture frame. In the embodiment shown in FIGS. 1a, b the first texture encoder and the first depth map encoder are provided by a single encoder 101a. In other embodiments, the first texture encoder and the first depth map encoder can be provided by separate encoders.

Moreover, the encoding apparatus 100 shown in FIGS. 1a, b comprises a depth map filter 119b configured to generate an auxiliary depth map on the basis of the first depth map, a first view synthesis prediction unit 121b configured to generate a view synthesis predicted video coding block of a second texture frame associated with a second view on the basis of the video coding block of the first texture frame and the auxiliary depth map, and a second view synthesis prediction unit 117b configured to generate a view synthesis predicted video coding block of a second depth map associated with the view synthesis predicted video coding block of the second texture frame on the basis of the first depth map.

Further components of the encoding apparatus 100 as well as the operation of the encoding apparatus 100 will be described in the following. Both texture and depth map frames associated with the reference view are split into non-overlapping video coding blocks. For each video coding block a predicted video coding block $T'''_{R,k}DM'''_{R,k}$ for the reference frame is subtracted to obtain a prediction error. Then the video coding block is transformed, quantized and entropy encoded (see functional blocks 101a and 105a in FIG. 1a). The encoded video coding blocks are provided to a functional block 103a, which performs a reverse transformation and quantization (indicated as "iTR+iQ" in FIG. 1a). This processing step can result in a quantization error. The reconstructed video coding block is made available for intra prediction of other video coding blocks in the same frame (see functional block 109a in FIG. 1a). Moreover, the video coding block can be processed by a loop filter 107a and stored in the reference picture buffer 111a. Thus, the video coding block is also available for inter prediction of other frames (see functional block 113a of FIG. 1a). The inter prediction can be based on a motion estimation (see functional block 115a of FIG. 1a). In an embodiment, a control unit can select the video coding block and the mode (intra/inter), which is used as predictor for a particular video coding block. This information is also needed by the decoder and hence also entropy coded by the entropy encoder 105a. The reconstructed texture and depth map frames are made available to the dependent layer portion of the apparatus 100, which is shown in FIG. 1b and will be described in the following.

As several of the functional blocks of the dependent layer portion of the apparatus 100 can be identical to the corresponding functional blocks of the reference layer portion of the apparatus 100, only the differences between these two portions will be explained in more detail. In addition to the texture and depth map frames, which are also available in the reference layer portion of the apparatus 100, the dependent layer portion of the apparatus 100 shown in FIG. 1b also has the reconstructed texture and depth map frames $\widetilde{T}''_{R,k}$, $\widetilde{DM}''_{R,k}$ of the reference layer (first view) as input. The reconstructed depth map of the reference texture frame is processed using a view synthesis prediction unit 117b in order to create a predictor for the depth map of the dependent view. Such predictor is also indicated as view synthesis predicted depth map $\widehat{DM}''_{R,k}$. This predictor is added to the reference picture buffer 111b. Further the reconstructed depth map $\widetilde{DM}''_{R,k}$ of the reference texture frame is filtered by means of the depth map filter 119b, which will be described in more detail further below, in order to generate the auxiliary depth map $\overline{DM}''_{R,k}$ on the basis of the reconstructed depth map $\widetilde{DM}''_{R,k}$. The auxiliary depth map $\overline{DM}''_{R,k}$ is used together with the reconstructed texture frame $\widetilde{T}''_{R,k}$ of the reference view to perform a view synthesis prediction by means of a view synthesis prediction unit 121b in order to create a predictor of the dependent texture frame. Such predictor is also indicated as view synthesis predicted texture frame $\widehat{DM}''_{R,k}$. This predictor is added to the reference picture buffer 111b.

The reference picture buffer 111b may include the view synthesis predicted texture frame and view synthesis predicted depth map as well as corresponding reconstructed texture frame $\widetilde{T}''_{D,k-1}$ and depth map $\widetilde{DM}''_{D,k-1}$ for the dependent view. The inter prediction unit 113b may receive as input the stored view synthesis predicted texture frame, view synthesis predicted depth map, the reconstructed texture frame $\widetilde{T}''_{D,k-1}$ and the reconstructed depth map $\widetilde{DM}''_{D,k-1}$ for the dependent view corresponding to a previous or reference frame. Alternatively the inter prediction unit 113b may receive only one of the view synthesis predicted texture frame and depth map or of the reconstructed texture frame and depth map. The decision as to which among the view synthesis predicted texture frame and the depth map and the reconstructed texture frame and depth map may be taken at the inter prediction unit, for instance based on a distortion cost function, such as a Lagrangian rate distortion cost function.

Based on at least one of the reconstructed texture frame and the view synthesis predicted texture frame and at least one of the reconstructed depth map the view synthesis predicted depth map the inter prediction unit 113b generates a predicted video coding block of a predicted texture frame and depth map $T'''_{D,k} DM'''_{D,k}$ for the dependent frame. The predicted texture frame and depth map can then be subtracted from the input texture frame and depth map to obtain a prediction error. The processing for the dependent view is then similar to the process already described with reference to the reference view.

The corresponding decoding apparatus 200 shown in FIGS. 2a, b comprises a first texture decoder configured to decode a video coding block of a first texture frame associated with the reference view. Moreover, the apparatus 200 comprises a first depth map decoder configured to decode a video coding block of a first depth map associated with the first texture frame. In the embodiment shown in FIGS. 2a, b the first texture decoder and the first depth map decoder are provided by a single decoder 201a. In other embodiments, the first texture encoder and the first depth map encoder can be provided by separate encoders.

Moreover, the decoding apparatus 200 shown in FIGS. 2a, b comprises a depth map filter 219b configured to generate an auxiliary depth map on the basis of the first depth map, a first view synthesis prediction unit 221b configured to generate a predicted video coding block of a second texture frame associated with a second view on the basis of the video coding block of the first texture frame and the auxiliary depth map, and a second view synthesis prediction unit 217b configured to generate a predicted video coding block of a second depth map associated with the predicted video coding block of the second texture frame on the basis of the first depth map.

Further components of the decoding apparatus 200 as well as the operation of the decoding apparatus 200 will be described in the following. The decoding apparatus includes an entropy coding unit 205a configured to receive as input an encoded bitstream. The input bitstream may include a texture frame and depth map frame as well as side information such as at least one of partition mode, motion information, intra/inter mode and the like. Both texture frames and depth map frames of the reference view are split into non-overlapping video coding blocks. The residual of a video coding block for both the texture frames and depth maps of the reference view is read from the entropy coding unit 205a together with the corresponding parameters for inter and intra prediction. The residual is added to the obtained predictor. Then reverse transform and quantization of the video coding block are computed in order to reconstruct the video coding block (see functional block 201a of FIG. 2a). The reconstructed video coding block is made available for intra prediction of other blocks in the same frame (see functional block 209a of FIG. 2a). Further the video coding block can be processed by a loop filter 207a and stored in the reference picture buffer 211a. The video coding block is then also available for inter prediction of other frames (see functional block 213a of FIG. 2a). The inter prediction can be based on a motion compensated prediction (see functional block 215a of FIG. 1a). Frames can be outputted in output order from the buffer 211a.

As several of the functional blocks of the dependent layer portion of the decoding apparatus 200 can be identical to the corresponding functional blocks of the reference layer portion of the decoding apparatus 200, only the differences between these two portions will be explained in more detail. In addition to the texture and depth map frames, which are also available in the reference layer portion of the decoding apparatus 200, the dependent layer portion of the decoding apparatus 200 also has the reconstructed texture frames and depth map frames $\widehat{DM''}_{R,k}, \widehat{T''}_{R,k}$ of the reference view as input available. The reconstructed depth map of the reference texture frame is processed by a view synthesis prediction unit 217b in order to create a predictor for the depth map of the dependent view. Such predictor is also indicated as view synthesis predicted depth map. This predictor is added to the reference picture buffer 211b. Moreover, the reconstructed depth map of the reference texture frame is filtered by means of the depth map filter 219b for generating the auxiliary depth map, which will be described in more detail further below. The auxiliary depth map is used together with the reconstructed texture frame of the reference view to perform a view synthesis prediction by means of a view synthesis prediction unit 221b in order to create a predictor of the dependent texture frame. Such predictor is also indicated as view synthesis predicted texture frame. This predictor is added to the reference picture buffer 211b. As already described with reference to the encoder, the reference picture buffer 211b may include the view synthesis predicted texture frame and view synthesis predicted depth map as well as corresponding reconstructed texture frame $\widetilde{T''}_{D,k-1}$ and depth map $\widehat{DM''}_{D,k-1}$ for the dependent view. The description of the function of the buffer 211b and of the inter prediction unit 215b is the same as described with reference to the encoder and will not described again.

In an embodiment, the depth map filters 119b, 219b are configured to detect edges in the first depth map. To this end, the depth map filters 119b, 219b could comprise an edge detection algorithm known from image processing. In an embodiment, the extracted edges are treated as the only reliable data in the depth map by using this data for generating the auxiliary depth map.

Figure 3:
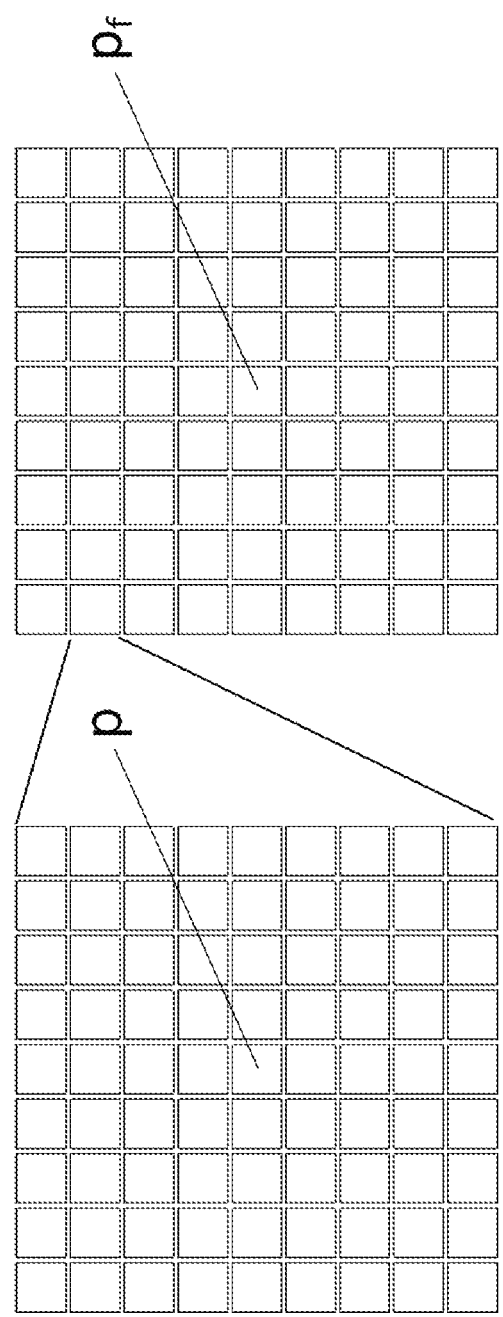
FIG. 3 shows a schematic diagram illustrating exemplary windows for generating an auxiliary depth map as implemented in an apparatus for encoding or decoding 3D video data according to an embodiment.

FIG. 3 shows a schematic diagram illustrating two exemplary windows used for generating the auxiliary depth map by the depth map filters 119b, 219b according to an embodiment. In this exemplary embodiment, edges are detected in the depth map based on the variance of the pixel values in a 9×9 pixel window, as shown in FIG. 3. In an embodiment, the edges lie between pixels. In such an embodiment, an edge is always two pixels wide, i.e. it contains one pixel for both regions separated by the edge. If one of the regions is foreground, the other background, this achieves a clear separation of both regions. In order to determine if a pixel belongs to an edge, the window is centered at it. Then, the mean variance in the window is calculated and used as a threshold for the classification of the pixel. If the variance of the center pixel is higher than the threshold it belongs to an edge. This is expressed in the following equations:

$$p_f = \overline{p^2} - (\overline{p})^2 = \text{VAR}(p), \text{ and}$$

$$e = \varepsilon(p_f - \overline{p_f}),$$

wherein p is the value of an input pixel, $p_f$ is the value of a filtered pixel and $\varepsilon(\ldots)$ is the unit step function, whose value is zero for negative arguments and one for positive arguments. Furthermore, $\bar{p}$, $\overline{p^2}$ and $\bar{p}_f$ denote the mean values of p, $p^2$ and $p_f$ over the 9×9 window of pixels.

In an embodiment, the depth map filter 119b, 219b is configured to generate the (linearly modelled) auxiliary depth map on the basis of the detected edges by solving the following boundary value problem:

$$\nabla(\nabla Z^*)=0,$$

$$Z^*|_{\partial\Omega_D}=Z|_{\partial\Omega_D}, \text{ and}$$

$$\nabla Z^*_n|_{\partial\Omega_N}=0,$$

wherein $\nabla$ denotes the Nabla operator, $Z|_{\partial\Omega_D}$ denotes the detected depth map edges, $\partial\Omega_N$ denotes the position of the image borders, and Z denotes the depth as the distance to the camera. If the pixel values do not map linearly to the range of Z, a denormalization can be performed. The values Z* can be estimated from the values Z located on the detected edges. $\nabla Z^*_n|_{\partial\Omega_N}$ is the value of gradient normal to the edge $\partial\Omega_N$. This equation forces the depth map to be constant across edges.

In an embodiment, the depth map filter 119b, 219b is configured to approximate the divergence defined in the equations above by a suitable discrete realization such as finite differences.

The inner $\nabla$ operator computes the gradient of the depth map. The outer $\nabla$ operator computes the divergence of the inner vector field, which, in turn, is the result of the inner $\nabla$ operator:

$$div\vec{v} = \frac{\partial v_x}{\partial x} + \frac{\partial v_y}{\partial y} + \frac{\partial v_z}{\partial z} = \nabla \cdot \vec{v}$$

Requiring the divergence to be 0 corresponds to requiring the gradient to be constant:

$$\nabla Z^* = const$$

Since the gradient is constant, the auxiliary depth map changes linearly between the edges detected in the original depth map.

Figure 4A:
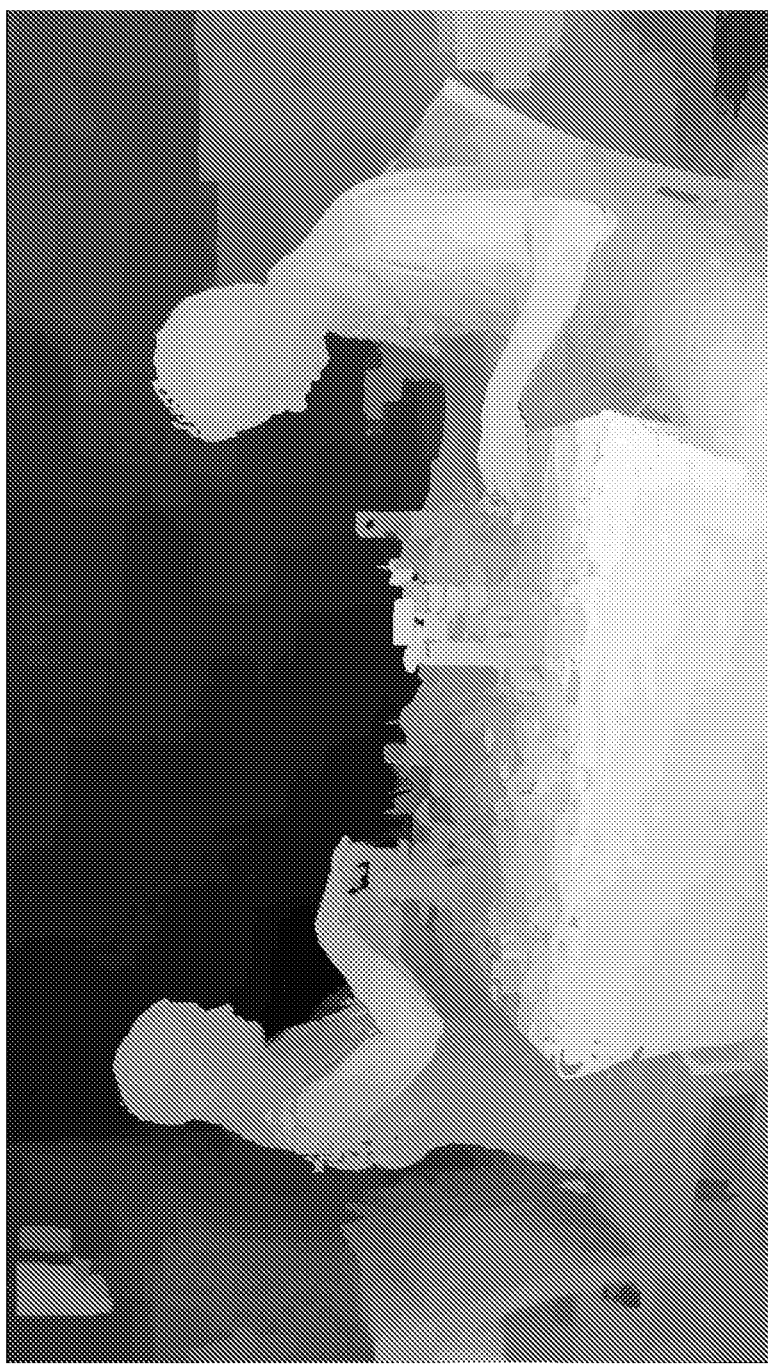
FIGS. 4a and 4b show an original depth map and an auxiliary depth map generated and used by an apparatus for encoding or decoding 3D video data according to an embodiment.
Figure 4B:
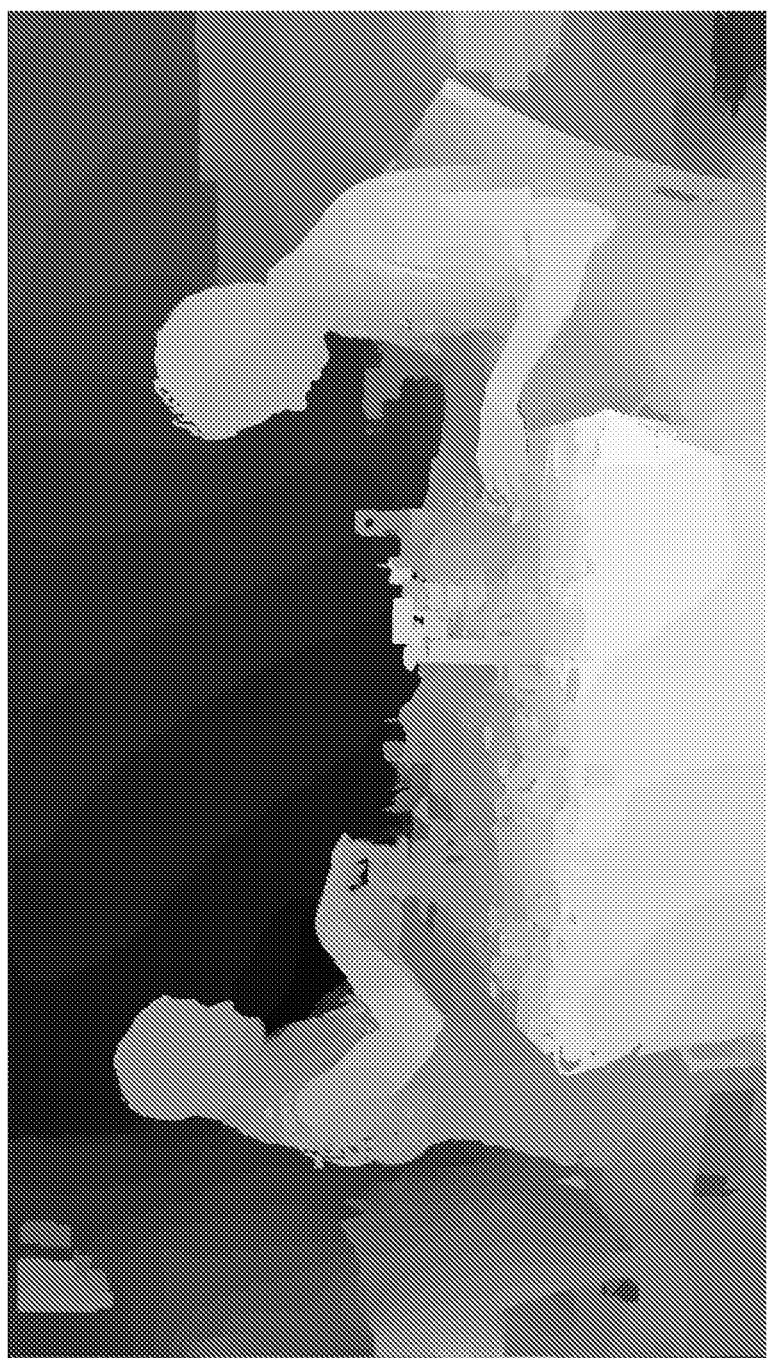

FIGS. 4a and 4b show the original depth map and the auxiliary depth map generated and used by the encoding apparatus 100 and the decoding apparatus 200 according to an embodiment using as an example the "Poznan Blocks Sequence". Clearly, the auxiliary depth map shown in FIG. 4b is much smoother and, therefore, leads to a better coding quality than the original depth map shown in FIG. 4a.

As already described above, in the context of FIGS. 1a,b and 2a,b the auxiliary depth map is used by the respective view prediction synthesis unit 121b, 221b for warping the texture frame of "View 0" to "View 1". Due to the smooth behavior of the auxiliary depth map embodiments of the invention results in a more consistent "Warped 0", i.e. the texture frame of "View 0" warped to "View 1". In an exemplary implementation, the texture frame "Warped 0" can be inserted into the reference picture list as an additional reference picture for "View 1". In an embodiment, video coding blocks in "Warped 0" can be chosen by the encoding apparatus 100 or the decoding apparatus 200 for the prediction of "View 1", leading to an increased coding performance of the encoded dependent texture frames. The original depth map of "View 0" can be used for prediction of "View 1" via warping, but for warping of the texture frame the auxiliary depth map is used.

Figure 5:
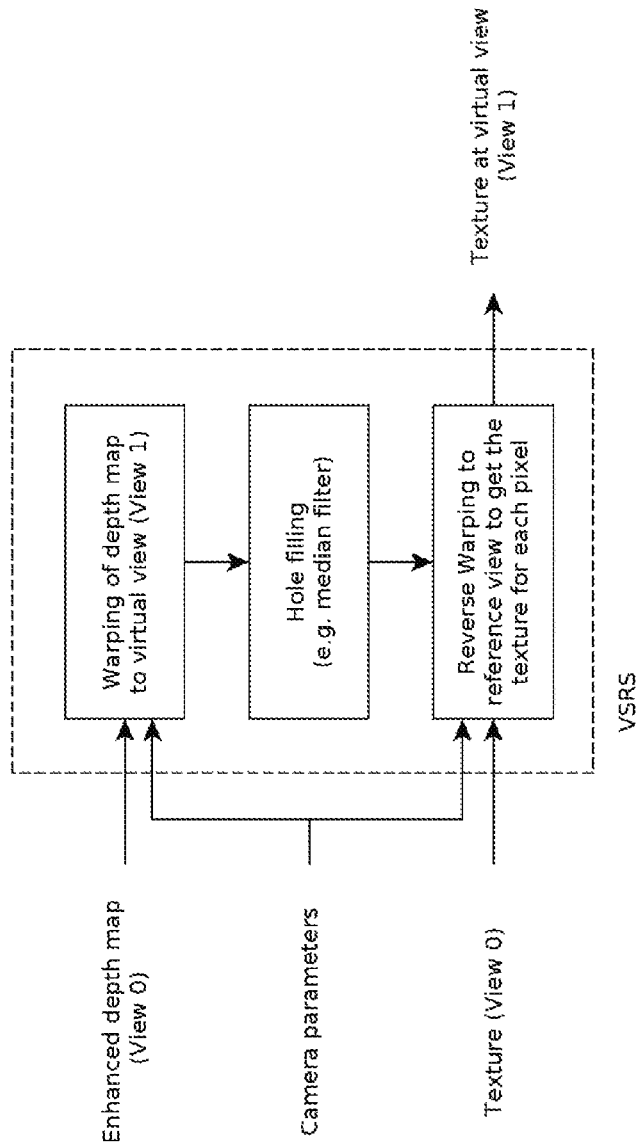
FIG. 5 shows a schematic diagram illustrating a warping mechanism that can be implemented in an apparatus for encoding or decoding 3D video data according to an embodiment.

Such an embodiment is illustrated in FIG. 5, which shows the texture frame warping mechanism employed by the MPEG View Synthesis Reference Software (VSRS). The auxiliary depth map, i.e. the enhanced depth map, and the texture frame of the reference view ("View 0") are inputs to the warping mechanism. Furthermore, the camera parameters are provided in order to compute the matrices needed to perform the warping between the views. They can consist of extrinsic and intrinsic parameters for each camera. The extrinsic parameters are a rotation matrix and a translation vector. The intrinsic parameters consist of focal length, radial distortion and principal point of the camera. The output of the warping mechanism illustrated in FIG. 5 is the texture at the dependent or virtual view ("View 1").

Figure 6:
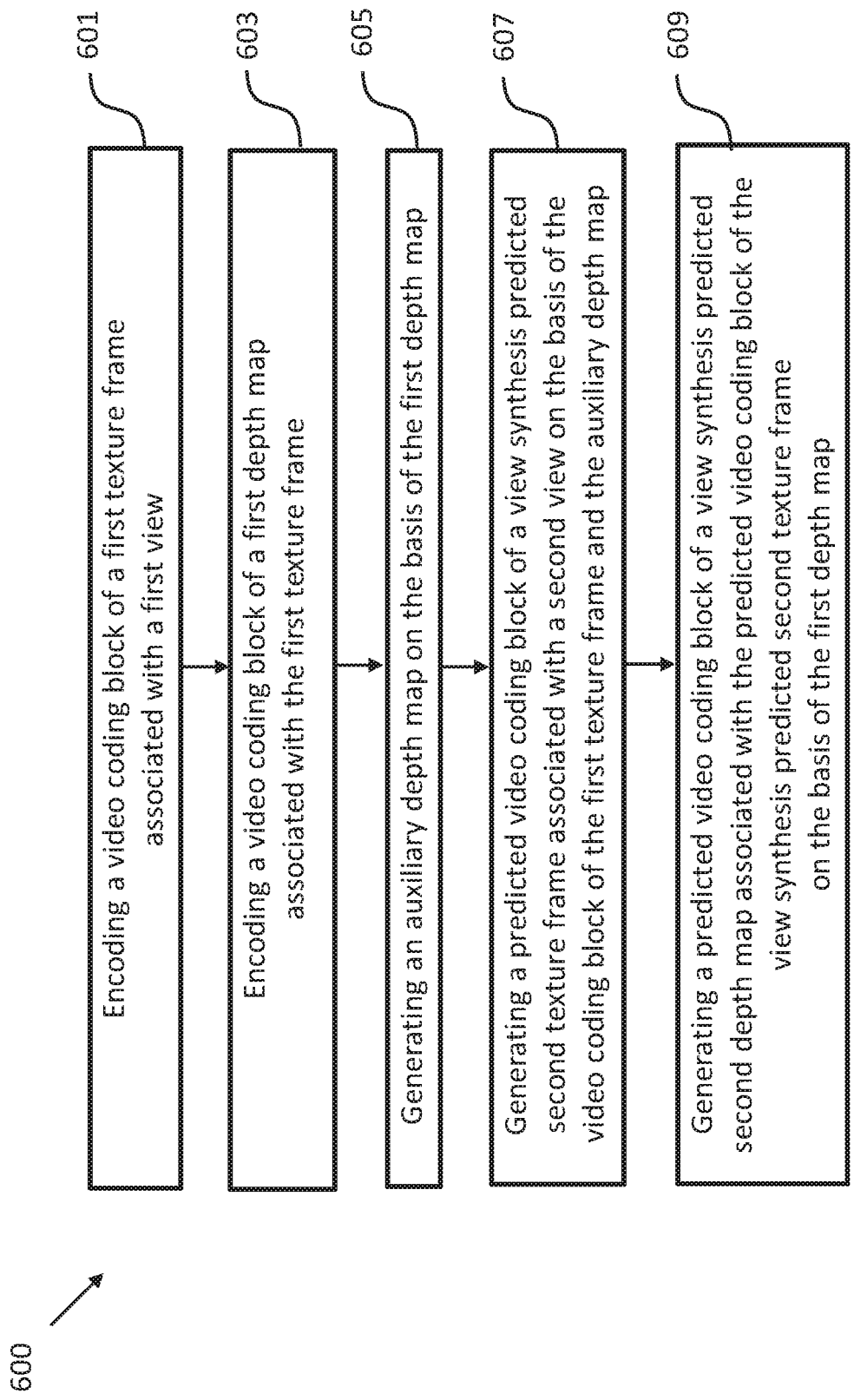
FIG. 6 shows a schematic diagram illustrating a method for encoding 3D video data according to an embodiment.

FIG. 6 shows a schematic diagram illustrating a method 600 for encoding 3D video data according to an embodiment. The method 600 comprises a step 601 of encoding a video coding block of a first texture frame associated with a first view, a step 603 of encoding a video coding block of a first depth map associated with the first texture frame, a step 605 of generating an auxiliary depth map on the basis of the first depth map, a step 607 of generating a predicted video coding block of a view synthesis predicted second texture frame associated with a second view on the basis of the video coding block of the first texture frame and the auxiliary depth map, and a step 609 of generating a predicted video coding block of a view synthesis predicted second depth map associated with the predicted video coding block of the view synthesis predicted second texture frame on the basis of the first depth map.

Figure 7:
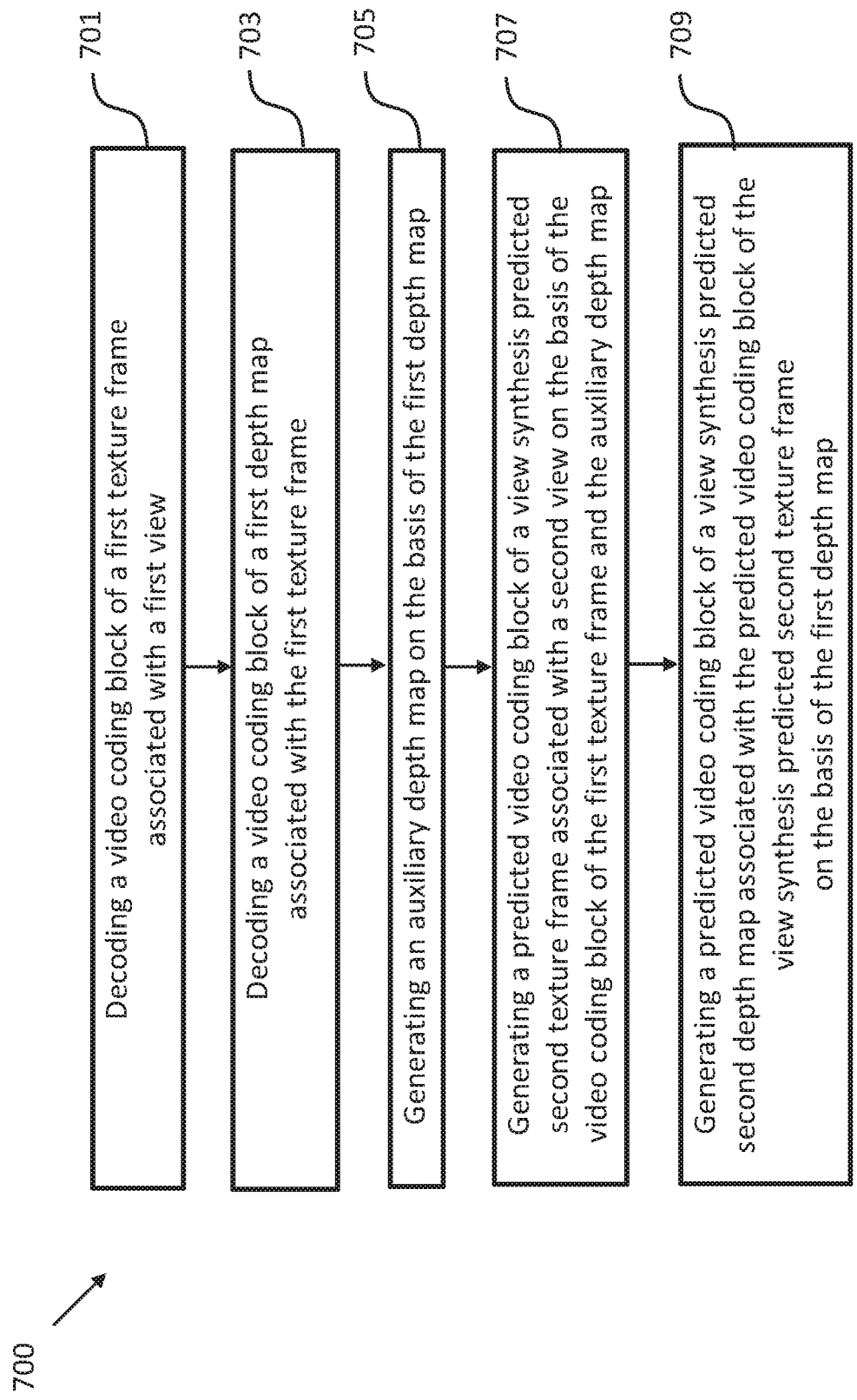
FIG. 7 shows a schematic diagram illustrating a method for decoding 3D video data according to an embodiment.

FIG. 7 shows a schematic diagram illustrating a method 700 for decoding 3D video data according to an embodiment. The method 700 comprises a step 701 of decoding a video coding block of a first texture frame associated with a first view, a step 703 of decoding a video coding block of a first depth map associated with the first texture frame; a step 705 of generating an auxiliary depth map on the basis of the first depth map, a step 707 of generating a predicted video coding block of a view synthesis predicted second texture frame associated with a second view on the basis of the video coding block of the first texture frame and the auxiliary depth map, and a step 709 of generating a predicted video coding block of a view synthesis predicted second depth map associated with the predicted video coding block of the view synthesis predicted second texture frame on the basis of the first depth map.

While a particular feature or aspect of the disclosure may have been disclosed with respect to only one of several implementations or embodiments, such a feature or aspect may be combined with one or more further features or aspects of the other implementations or embodiments as may be desired or advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives thereof may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present invention has been described with reference to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A non-transitory computer-readable medium storing executable instructions, which when executed by an apparatus for decoding 3D video data, the 3D video data comprising a plurality of texture frames and a plurality of associated depth maps, causes the apparatus to:
   decode a video coding block of a first texture frame associated with a first view;
   decode a video coding block of a first depth map associated with the first texture frame;
   detect at least one edge in the first depth map and generate an auxiliary depth map on the basis of pixels of the first depth map in the vicinity of the at least one edge and as the solution of a boundary value problem $\nabla(\nabla Z^*)=0$, $Z^*|_{\partial\Omega_D}=Z|_{\partial\Omega_D}$, and $\nabla Z^*_n|_{\partial\Omega_N}=0$, wherein $\nabla$ denotes a Nabla operator, $Z|_{\partial\Omega_D}$ denotes detected depth map edges, $\partial\Omega_N$ denotes a position of image borders, and Z denotes a depth as a distance to the camera, wherein the at least one edge in the first depth map defines a boundary of the boundary problem, wherein $Z^*$ values can be estimated from Z values located on detected edges, and wherein $\nabla Z|_{\partial\Omega_N}$ is a value of gradient normal to an edge $\partial\Omega_N$;
   generate a predicted video coding block of a view synthesis predicted second texture frame associated with a second view on the basis of the video coding block of the first texture frame and the auxiliary depth map by warping the video block of the first texture frame according to the auxiliary depth map and camera parameters; and
   generate a predicted video coding block of a view synthesis predicted second depth map on the basis of the first depth map, wherein the view synthesis predicted second depth map is associated with the view synthesis predicted second texture frame.

2. The non-transitory computer-readable medium of claim 1, wherein the executable instructions further cause the apparatus to:
   decode a video coding block of a second texture frame associated with the second view on the basis of the predicted video coding block of the view synthesis predicted second texture frame; and
   decode a video coding block of the second depth map associated with the second texture frame on the basis of the predicted video coding block of the view synthesis predicted second depth map.

3. The non-transitory computer-readable medium of claim 1, wherein the executable instructions further cause the apparatus to detect the at least one edge in the first depth map by detecting at least one pixel in the first depth map, for which mean variance of depth values of the pixels of the first depth map in the vicinity of the at least one pixel is larger than a threshold value.

4. A non-transitory computer-readable medium storing executable instructions, which when executed by an apparatus for encoding 3D video data, the 3D video data comprising a plurality of texture frames and a plurality of associated depth maps, causes the apparatus to:
   encode a video coding block of a first texture frame associated with a first view;
   encode a video coding block of a first depth map associated with the first texture frame;
   detect at least one edge in the first depth map and generate an auxiliary depth map on the basis of the pixels of the first depth map in the vicinity of the at least one edge and as the solution of a boundary value problem $\nabla(\nabla Z^*)=0$, $Z^*|_{\partial\Omega_D}=Z|_{\partial\Omega_D}$, and $\nabla Z^*_n|_{\partial\Omega_N}=0$, wherein $\nabla$ denotes a Nabla operator, $Z|_{\partial\Omega_D}$ denotes detected depth map edges, $\partial\Omega_N$ denotes a position of image borders, and Z denotes a depth as a distance to the camera, wherein the at least one edge in the first depth map defines a boundary of the boundary problem, wherein $Z^*$ values can be estimated from Z values located on detected edges, and wherein $\nabla Z^*_n|_{\partial\Omega_N}$ is a value of gradient normal to an edge $\partial\Omega_N$;
   generate a predicted video coding block of a view synthesis predicted second texture frame associated with a second view on the basis of the video coding block of the first texture frame and the auxiliary depth map by warping the video coding block of the first texture frame according to the auxiliary depth map and camera parameters; and
   generate a predicted video coding block of a view synthesis predicted second depth map on the basis of the first depth map, wherein the view synthesis predicted second depth map is associated with the predicted video coding block of the view synthesis predicted second texture frame.

5. The non-transitory computer-readable medium of claim 4, wherein the executable instructions further cause the apparatus to:
   encode a video coding block of a second texture frame associated with the second view on the basis of the predicted video coding block of the view synthesis predicted second texture frame; and
   encode a video coding block of a second depth map associated with the second texture frame on the basis of the predicted video coding block of the view synthesis predicted second depth map associated with the predicted video coding block of the view synthesis predicted second texture frame.

6. The non-transitory computer-readable medium of claim 4, wherein the executable instructions further cause the apparatus to detect the at least one edge in the first depth map by detecting at least one pixel in the first depth map, for which mean variance of depth values of the pixels of the first depth map in the vicinity of the at least one pixel is larger than a threshold value.

7. A method for decoding 3D video data, the 3D video data comprising a plurality of texture frames and a plurality of associated depth maps, the method comprising:

decoding a video coding block of a first texture frame associated with a first view;

decoding a video coding block of a first depth map associated with the first texture frame;

detecting at least one edge in the first depth map and generating an auxiliary depth map on the basis of the pixels of the first depth map in the vicinity of the at least one edge and as the solution of a boundary value problem $\nabla(\nabla Z^*)=0$, $Z^*|_{\partial\Omega_D}=Z|_{\partial\Omega_D}$, and $\nabla Z^*_n|_{\partial\Omega_N}=0$, wherein $\nabla$ denotes a Nabla operator, $Z|_{\partial\Omega_D}$ denotes detected depth map edges, $\partial\Omega_N$ denotes a position of image borders, and $Z$ denotes a depth as a distance to the camera, wherein the at least one edge in the first depth map defines a boundary of the boundary problem, wherein $Z^*$ values can be estimated from $Z$ values located on detected edges, and wherein $\nabla Z^*_n|_{\partial\Omega_N}$ is a value of gradient normal to an edge $\partial\Omega_N$;

generating a predicted video coding block of a view synthesis predicted second texture frame associated with a second view on the basis of the video coding block of the first texture frame and the auxiliary depth map by warping the video coding block of the first texture frame according to the auxiliary depth map and camera parameters; and generating a predicted video coding block of a view synthesis predicted second depth map associated with the predicted video coding block of the view synthesis predicted second texture frame on the basis of the first depth map.

8. A method for encoding 3D video data, the 3D video data comprising a plurality of texture frames and a plurality of associated depth maps, the method comprising:

encoding a video coding block of a first texture frame associated with a first view;

encoding a video coding block of a first depth map associated with the first texture frame;

detecting at least one edge in the first depth map and generating an auxiliary depth map on the basis of the pixels of the first depth map in the vicinity of the at least one edge and as the solution of a boundary value problem $\nabla(\nabla Z^*)=0$, $Z^*|_{\partial\Omega_D}=Z|_{\partial\Omega_D}$, and $\nabla Z^*_n|_{\partial\Omega_N}=0$, wherein $\nabla$ denotes a Nabla operator, $Z|_{\partial\Omega_D}$ denotes detected depth map edges, $\partial\Omega_N$ denotes a position of image borders, and $Z$ denotes a depth as a distance to the camera, wherein the at least one edge in the first depth map defines a boundary of the boundary problem, wherein $Z^*$ values can be estimated from $Z$ values located on detected edges, and wherein $\nabla Z^*_n|_{\partial\Omega_N}$ is a value of gradient normal to an edge $\partial\Omega_N$;

generating a predicted video coding block of a view synthesis predicted second texture frame associated with a second view on the basis of the video coding block of the first texture frame and the auxiliary depth map by warping the video coding block of the first texture frame according to the auxiliary depth map and camera parameters; and generating a predicted video coding block of a view synthesis predicted second depth map associated with the predicted video coding block of the view synthesis predicted second texture frame on the basis of the first depth map.

9. A non-transitory computer-readable medium, comprising program code for performing the method of claim 7, when executed on a computer.

10. A non-transitory computer-readable medium, comprising program code for performing the method of claim 8, when executed on a computer.

11. The method of claim 7, further comprising:

decoding a video coding block of a second texture frame associated with the second view on the basis of the predicted video coding block of the view synthesis predicted second texture frame; and decoding a video coding block of the second depth map associated with the second texture frame on the basis of the predicted video coding block of the view synthesis predicted second depth map.

12. The method of claim 7, further comprising:

detecting the at least one edge in the first depth map by detecting at least one pixel in the first depth map, for which mean variance of depth values of the pixels of the first depth map in the vicinity of the at least one pixel is larger than a threshold value.

13. The method of claim 8, further comprising:

encoding a video coding block of a second texture frame associated with the second view on the basis of the predicted video coding block of the view synthesis predicted second texture frame; and encoding a video coding block of a second depth map associated with the second texture frame on the basis of the predicted video coding block of the view synthesis predicted second depth map associated with the predicted video coding block of the view synthesis predicted second texture frame.

14. The method of claim 8, further comprising: detecting the at least one edge in the first depth map by detecting at least one pixel in the first depth map, for which mean variance of depth values of the pixels of the first depth map in the vicinity of the at least one pixel is larger than a threshold value.

* * * * *